(12) United States Patent
Sevilla et al.

(10) Patent No.: US 10,738,904 B1
(45) Date of Patent: Aug. 11, 2020

(54) FLOW CONTROL VALVE USING CERAMIC VALVE MEMBERS

(71) Applicant: Clippard Instrument Laboratory, Inc., Cincinnati, OH (US)

(72) Inventors: Thomas A. Sevilla, Loveland, OH (US); Michael D. Maroon, Lebanon, OH (US)

(73) Assignee: Clippard Instrument Laboratories, I, Cincinnati, OH (US)

( * ) Notice: Subject to any disclaimer, the term of this patent is extended or adjusted under 35 U.S.C. 154(b) by 0 days.

(21) Appl. No.: 16/269,983

(22) Filed: Feb. 7, 2019

(51) Int. Cl.
| F16K 27/04 | (2006.01) |
| F16K 27/00 | (2006.01) |
| F16K 3/08 | (2006.01) |
| F16K 3/34 | (2006.01) |

(52) U.S. Cl.
CPC .............. *F16K 27/044* (2013.01); *F16K 3/08* (2013.01); *F16K 3/34* (2013.01); *F16K 27/003* (2013.01)

(58) Field of Classification Search
CPC ........ F16K 27/044; F16K 3/08; F16K 27/003; F16K 3/34
USPC .................................. 251/205–209, 326–329
See application file for complete search history.

(56) References Cited

U.S. PATENT DOCUMENTS

| 2,601,231 A | * | 6/1952 | Smith | ................... | F16K 3/0209 |
| | | | | | 137/625.33 |
| 3,463,192 A | | 8/1969 | Herion, Jr. | | |
| 3,556,151 A | | 1/1971 | Masuda | | |
| 4,205,822 A | * | 6/1980 | Bernat | ...................... | F16K 3/32 |
| | | | | | 251/208 |
| 4,360,040 A | * | 11/1982 | Cove | ......................... | F16K 3/34 |
| | | | | | 137/625.3 |
| 4,489,756 A | * | 12/1984 | Balz | ...................... | F16K 3/0263 |
| | | | | | 137/625.33 |
| 4,756,647 A | * | 7/1988 | Fassbinder | ......... | B65G 53/4616 |
| | | | | | 406/131 |

(Continued)

FOREIGN PATENT DOCUMENTS

| EP | 0361183 A1 | 4/1990 |
| EP | 1450084 B1 | 5/2006 |

(Continued)

OTHER PUBLICATIONS

PCT/US2020/016984 International Search Report dated Apr. 16, 2020.

*Primary Examiner* — John Bastianelli
(74) *Attorney, Agent, or Firm* — Wood Herron & Evans LLP

(57) ABSTRACT

A flow control valve uses two ceramic members having conforming surfaces which are coupled together to form a fluid-tight seal, and slidable relative to each other to control fluid flow. Elongated obround apertures in the members mate to each other to form a fluid path which is wholly contained within the ceramic members. The members slide along the elongated dimension of the obround apertures between a closed position and controllable open positions where the obround apertures overlap creating an obround flow path of a controlled size. The shaping of the first and second apertures and their interaction when the valve is opened and closed permits fine control of the flow of fluid through the apertures under controlled sliding movement of the ceramic members relative to each other.

9 Claims, 9 Drawing Sheets

(56) References Cited

U.S. PATENT DOCUMENTS

| | | | |
|---|---|---|---|
| 4,801,265 A * | 1/1989 | Kratochwilla | A61C 1/0038 433/98 |
| 4,968,004 A * | 11/1990 | Berchem | F16K 3/0263 137/15.22 |
| 5,020,774 A * | 6/1991 | Christianson | F16K 3/32 251/129.15 |
| 5,735,501 A * | 4/1998 | Maurer | F16K 3/0272 251/327 |
| 5,931,374 A | 8/1999 | Knapp | |
| 6,338,906 B1 | 1/2002 | Ritland et al. | |
| 7,445,018 B1 * | 11/2008 | Morando | F16K 3/0263 137/15.07 |
| 8,523,141 B2 * | 9/2013 | Elliott | F16K 47/08 251/127 |
| 2004/0228212 A1 | 11/2004 | de Goor et al. | |
| 2015/0276068 A1 * | 10/2015 | Roman | F16K 3/02 251/329 |
| 2017/0204977 A1 | 7/2017 | Eggert et al. | |

FOREIGN PATENT DOCUMENTS

| | | |
|---|---|---|
| EP | 2444702 A1 | 4/2012 |
| JP | H09269073 A | 10/1997 |

\* cited by examiner

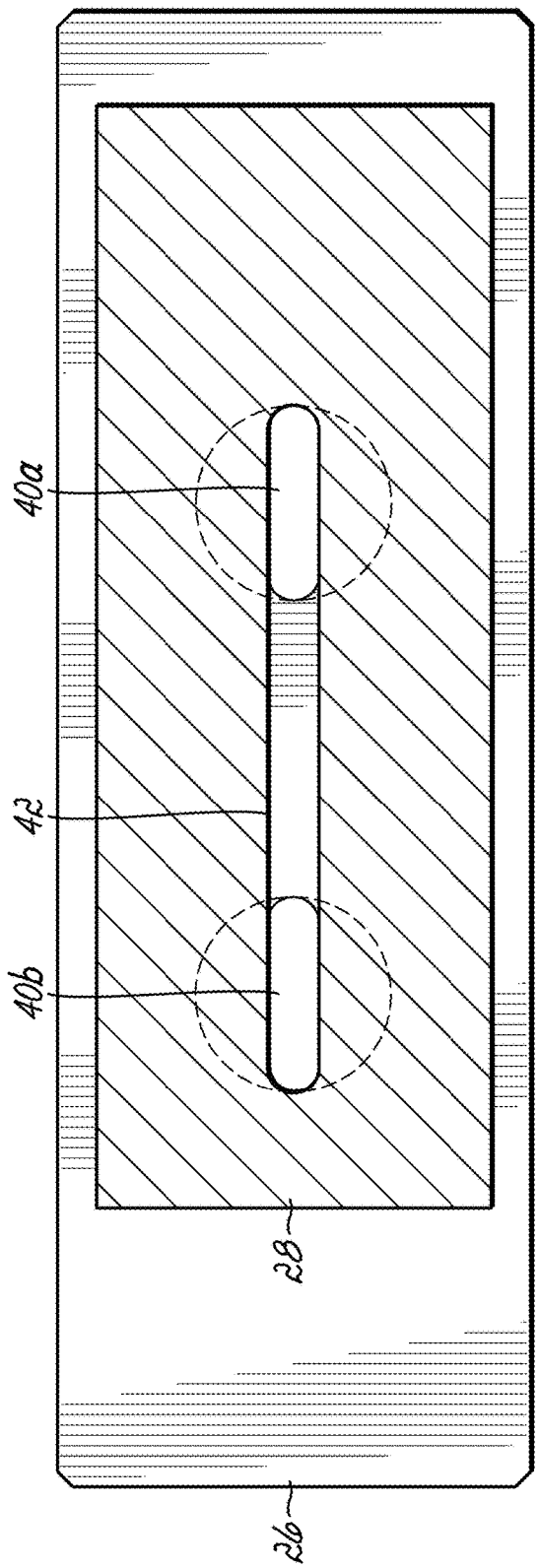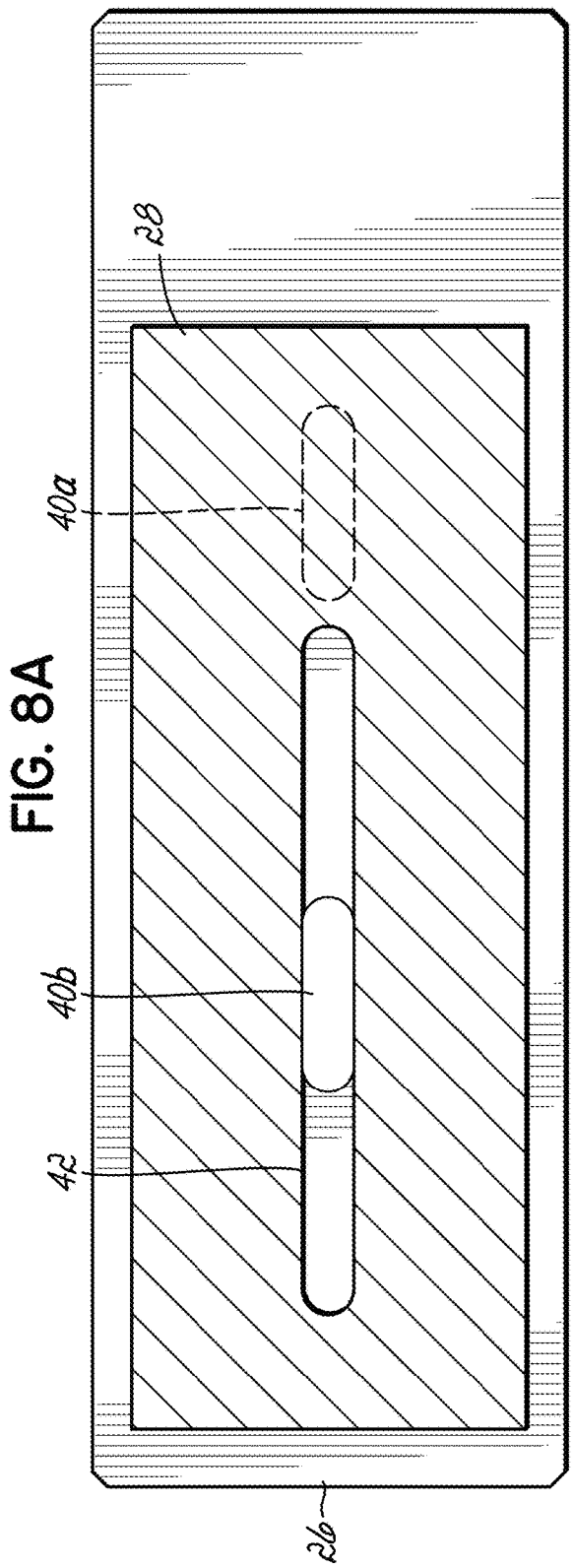

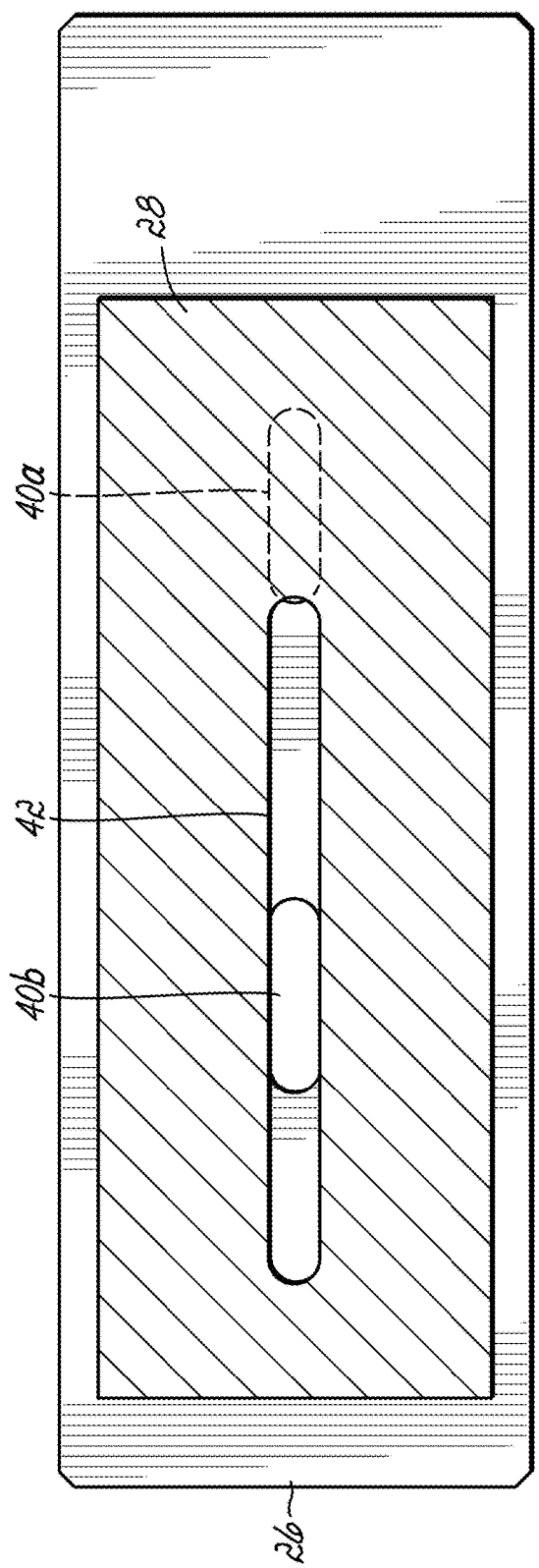
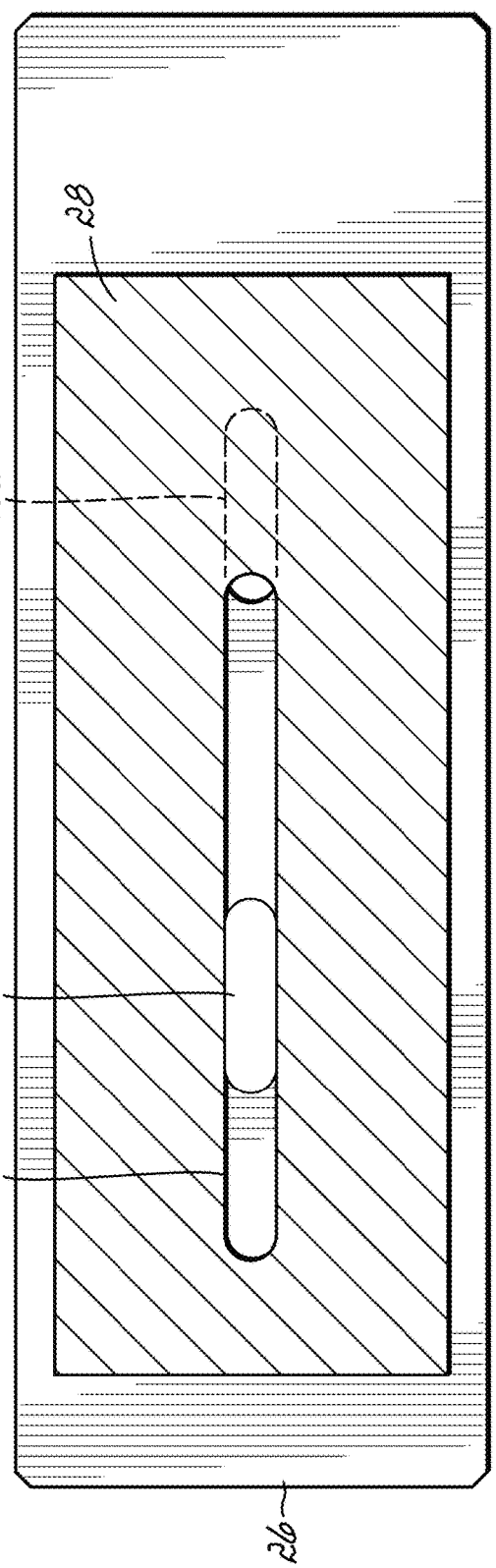

FLOW CONTROL VALVE USING CERAMIC VALVE MEMBERS

BACKGROUND OF THE INVENTION

The present invention relates to flow control valves.

In many control embodiments it is necessary to provide fine control of the flow rate through a valve. This is often accomplished by a flow control valve. Flow control valves generally modulate the flow through a controlled aperture. For example, in one common design the valve has a small orifice with a tapered seat and a needle shaped plunger that is controllably adjusted into and out of the seat to finely control the size of the valve aperture and flow rate. The finely controlled movement of the needle into or out of the aperture permits fine adjustment of the amount of flow through the valve.

While needle valves are often used for flow control applications, unfortunately they are susceptible to wear when in use as a result of the constant flow of fluid through a narrow aperture that may also be subjected to substantial pressure drops. The controlled fluid flow tends to create mechanical vibrations which fatigue the needle, and/or wear and enlarge channels within the valve seat or needle, both of which prematurely age the valve. Due to the tight tolerances required for accurate flow control, a worn needle or valve seat typically requires replacement of the entire needle valve rather than repair with replacement parts.

It has been known to form valves using ceramic discs as valve elements. Ceramic valves have the advantage that the ceramic surfaces can be made very flat and thus form a seal based on Van der Waals force without the need for a gasket or other wear part. However, ceramic valves have thus far found only limited use. One exemplary use of ceramic in valves is a distribution valve, having two rotary ceramic elements, one of which carries a channel and the other of which includes an array of ports to which the channel can be selectively connected based upon the relative positioning of the discs. The ceramic disc surfaces are highly planar, having been ground and/or polished during manufacture, and are able to provide an operational seal for the valve which allows sliding of the discs relative to each other. By sliding (for example, rotating) the discs relative to each other to a chosen location, flow can be directed to a desired one of the ports.

US Patent Publication 2017-0204977 discloses a ceramic disc valve for modulating the flow of fluid. A fixed disk includes an aperture which can be covered by a movable disc to close the valve, or the movable disc may be shifted from over the aperture to permit fluid flow. The fixed disc includes an aperture which is described as potentially circular, rectangular, elliptical, or triangular in cross section, which is covered or uncovered by the circular cross section of the movable disc as it slides across the fixed disk. The '977 application indicates this device may be use to modulate the flow of fuel to a fuel cell by controlled flow through the opening created between the movable disc and the circular, rectangular, elliptical or triangular aperture in the fixed disc.

SUMMARY OF THE INVENTION

According to principles of the present invention, a flow control valve is comprised of a housing containing a first and a second ceramic member, the first and second members having conforming surfaces which are coupled together to form a fluid-tight seal and are slideably movable relative to each other. The first member has a fluid flow aperture in its conforming surface having a first width and first length, where the first width is substantially less than the first length, and the second member has a fluid flow aperture in its conforming surface having a second width and second length, wherein the first width is substantially similar to the second width. The ceramic members are slidable on their confirming surfaces between a first position in which the first and second apertures do not overlap and fluid flow is obstructed, and a second position in which the first and second apertures overlap and fluid flow is permitted through the apertures.

Advantageously, the shaping of the first and second apertures with similar widths and substantially longer lengths permits fine control of the flow of fluid through the apertures under controlled sliding movement of the ceramic members relative to each other. In the detailed embodiment these shapes are conforming and obround and thus provide a well-controlled fluid path through the valve.

The valve according to the present invention has the further advantage that it may be arranged with flow paths in the ceramic members that constrain all fluid flow to the ceramic members themselves. In these specific embodiments, the first ceramic member comprises a first aperture and a third aperture, each of the first and third apertures extending having a width substantially similar to the second width of the second ceramic member aperture, the first and third apertures aligning with and overlapping with the second aperture of the second ceramic member to permit fluid flow between the first and third apertures when the ceramic members are in the second position.

In this embodiment, the second ceramic member comprises an aperture having an inlet and an outlet on the conforming surface of the second ceramic member, permitting fluid flow between the inlet and outlet on the conforming flat surface of the second ceramic member, with the flow thus entering and exiting through the first ceramic member and remaining within the ceramic members otherwise.

In the below-described embodiment, the first and second members are retained within a housing with the first ceramic member being fixed and the second ceramic member being movable. The second ceramic member is driven by a lead screw which is rotated by a drive motor and threaded through a bracket engaged to the second ceramic member. The first and second members are maintained with their conforming surfaces in contact by a resilient member extending between the second ceramic member and an interior of the housing. The resilient member may comprise, for example, a spring which is compressed between the second ceramic member and a sliding element which abuts an interior of the housing.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 8A, 8B, 8C and 8D illustrate the development of an opening when the movable ceramic member shown in FIGS. 1 through 6 slides across the fixed member of those Figures;

DETAILED DESCRIPTION OF THE INVENTION

The present invention will be elaborated with reference to a specific embodiment applied to a hospital room suite and monitoring station for that suite. While this environment will be described in some detail, the principles of the invention are applicable to numerous other environments and circumstances as noted herein.

Figure 1:
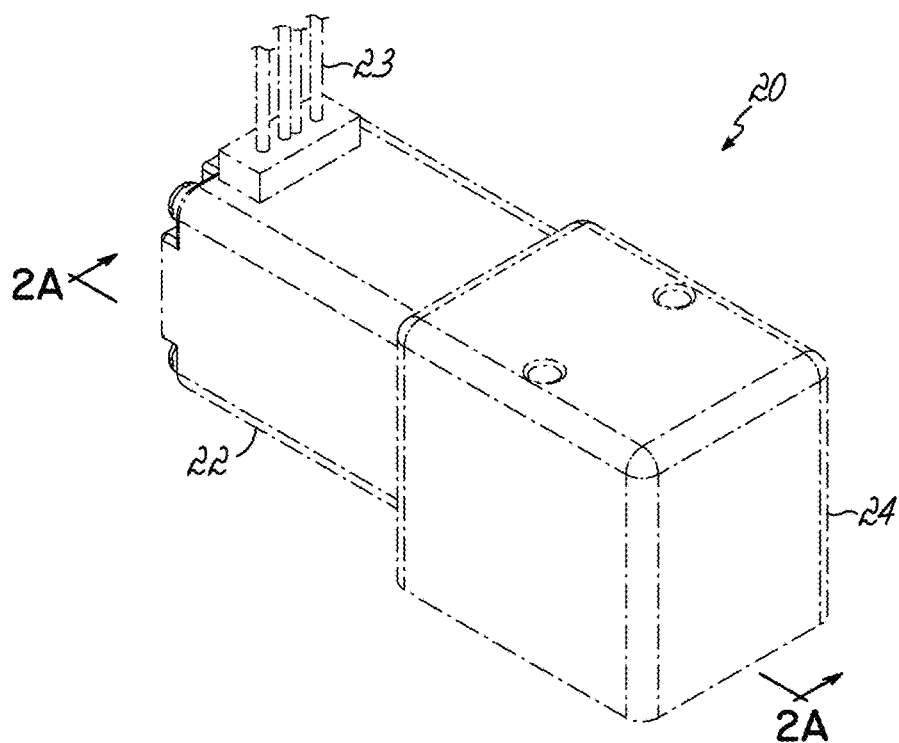
FIG. 1 is a perspective view of a ceramic flow control valve according to principles of the present invention, showing an exemplary housing of the kind that may be used by such a valve for environmental purposes.

Referring now to FIG. 1, a flow control valve 20 generally in accordance with principles of the present invention is shown. The valve includes a drive housing 22 for providing a motorized actuation of the valve in response to electrical signals on wires 23, and a housing 24 holding the ceramic elements which form the valve. The general structure of the exterior of the valve shown in FIG. 1 is merely representative, and a valve utilizing principles of the present invention may be implemented in a wide variety of forms. Accordingly, the detailed housing structure is shown in shadow lines in FIG. 1.

FIG. 2 illustrates the internal structure of a flow control valve in accordance with principles of the present invention. The valve includes, inside of a housing 24, a first ceramic member 26 and a second ceramic member 28 which have conforming (e.g., polished flat) abutting surfaces which form a fluid-tight seal therebetween.

The first ceramic member defines a first fluid flow channel 40a, which couples fluid from outside of the valve body through the first ceramic member and to the conforming surface. The second ceramic member defines a second flow channel 42 which couples fluid flow through the body of the second ceramic member to the conforming surface at a location spaced horizontally from the end of the first flow channel 40a. A third flow channel 40b in the first ceramic member 26 couples from the conforming surface through the first ceramic member to outside of the valve body.

A bracket 30 is engaged to the second ceramic member 28 to move the second ceramic member horizontally relative to the first ceramic member 26. The bracket 30 defines a threaded hole 29 which receives a lead screw 31, which may be rotated by a drive member in the drive housing 22 to move the bracket 30 and second ceramic member 28 relative to the first ceramic member 26.

Bracket 30 and second ceramic member 28 are held in compression against the first ceramic member 26 by a resilient member such as a springs 34, which engages to a slider 32 which slideably engages the interior of the housing 24. Rotation of the drive screw 31 thus moves the bracket 30, slider 32, springs 34 and second ceramic member 28 within the housing.

Figure 2A:
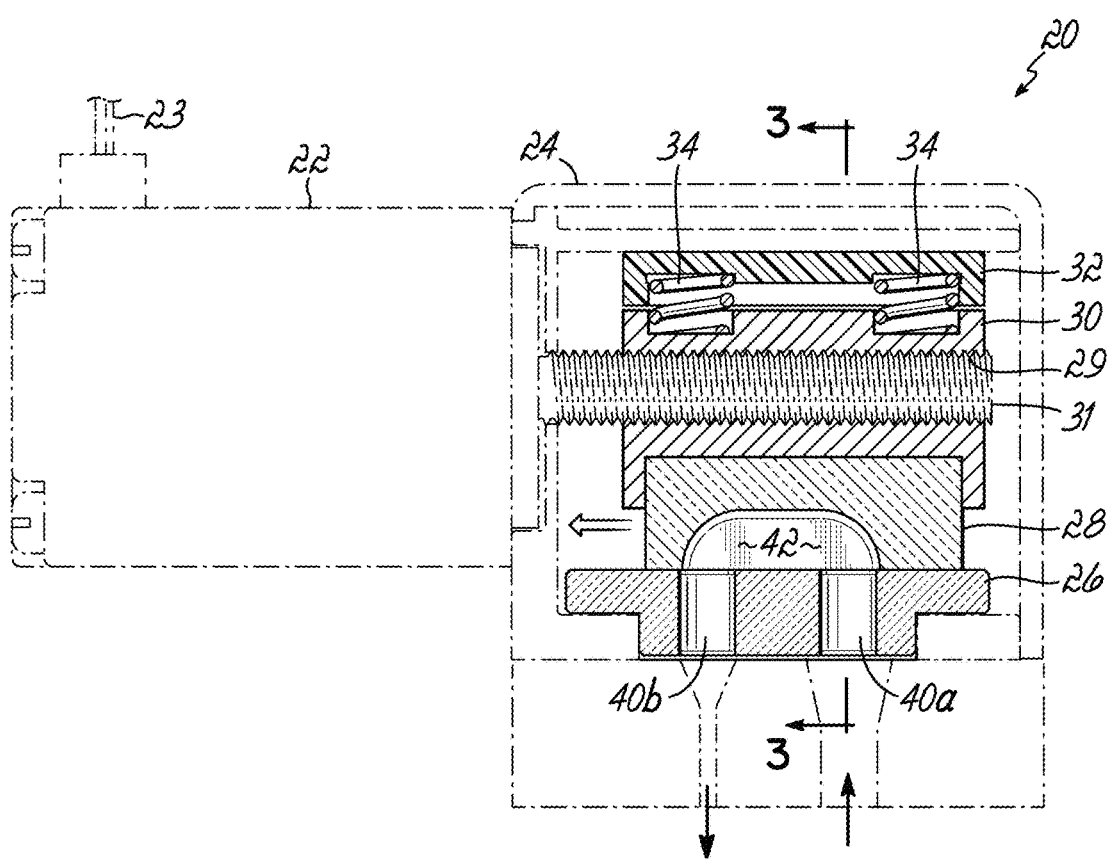
FIGS. 2A and 2B are cross-sectional views of the valve of FIG. 1 taken along lines 2A-2A of FIG. 1, showing the internal ceramic members and supporting structures of the valve when the valve is respectively fully open and fully closed.
Figure 2B:
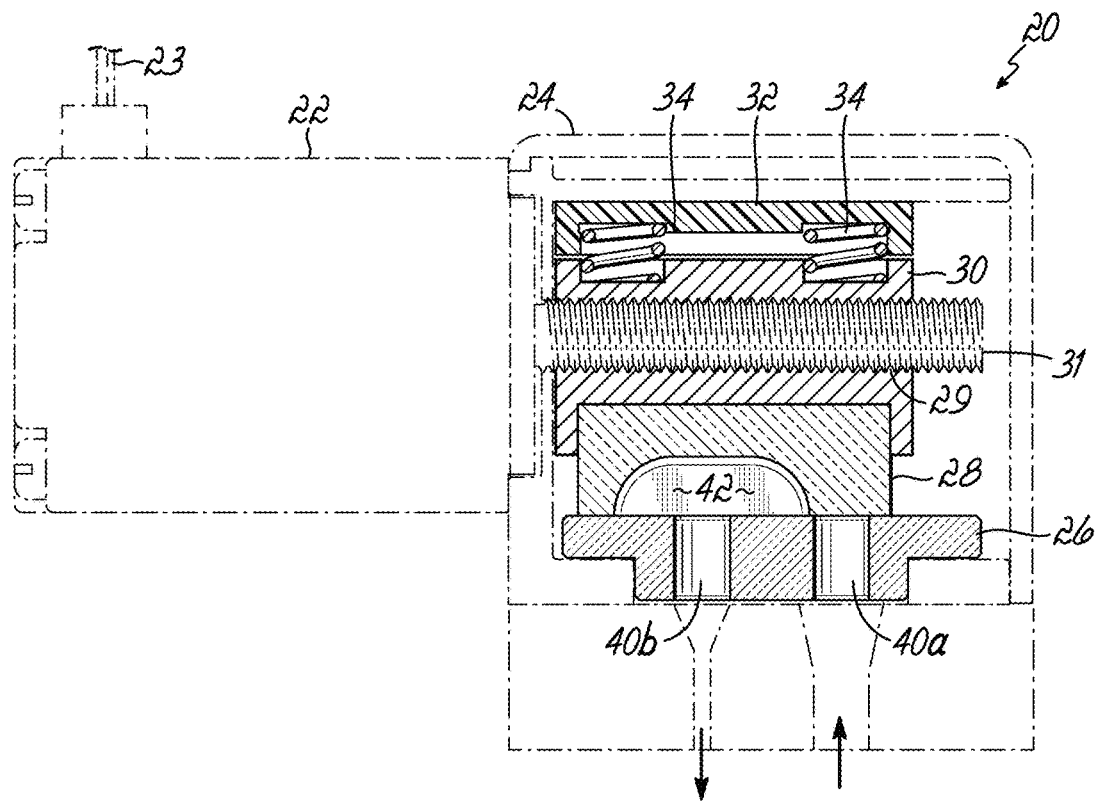

FIG. 2B illustrates the bracket 30, slider 32, springs 34 and second ceramic member 28 in a position displaced to the left relative to FIG. 2A. It can be seen in FIG. 2B that the first flow channel 40a no longer couples to the second flow channel 42 once the second ceramic member 28 has been displaced to this position. (The third flow channel 40b remains in fluid communication with the second flow channel 42.) Accordingly, flow is prevented in this position and the flow control valve is "off".

Figure 3:
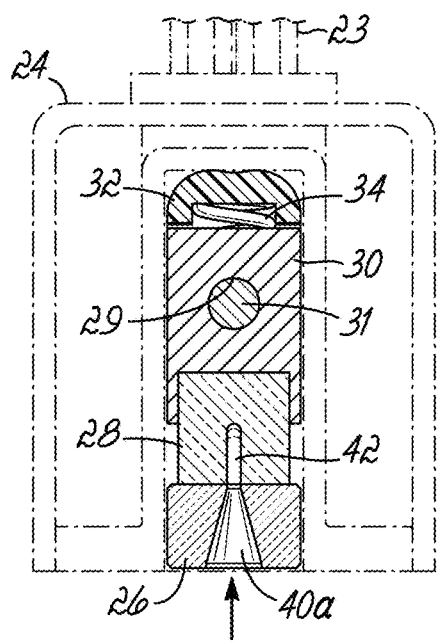
FIG. 3 is a cross-sectional view of the valve of FIGS. 1 and 2A taken along lines 3-3 in FIG. 2A, showing the internal ceramic members and supporting structures of the valve when fully open.

FIG. 3 illustrates the relative cross-sectional position and arrangement of parts in the flow control valve, and in particular the manner in which the cross section of the third flow channel 40b communicates with the second flow channel 42. It will be noted that the channels, at their intersecting ends, have an obround shape with similar widths and elongated lengths, which enables effective control of flow through the valve as will be explored below.

Figure 4:
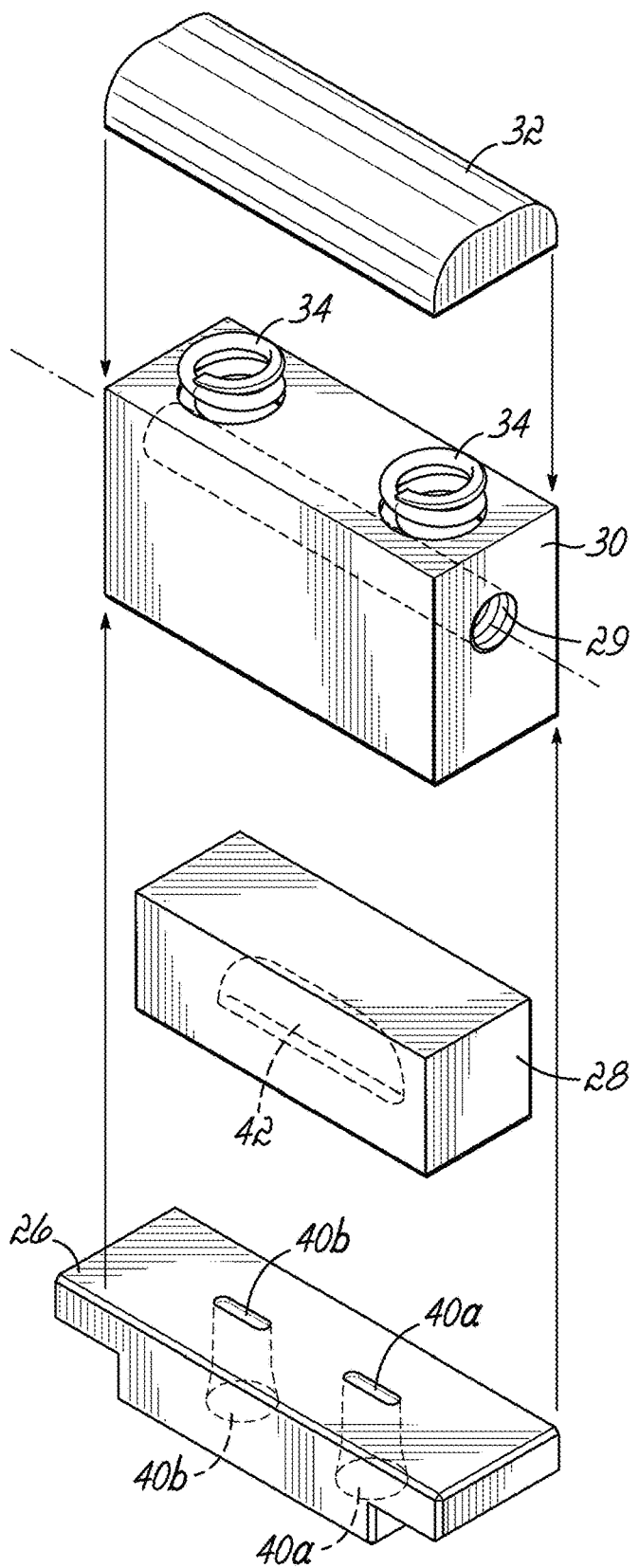
FIG. 4 is a disassembled perspective of the internal ceramic members and supporting structures of the valve of the preceding Figures.

FIG. 4 is a disassembled perspective view illustrating the relative positions and sizes of the bracket 30, slider 32, springs 34, second ceramic member 28 and first ceramic member 26. The first, second and third flow channels 40a, 42 and 40b are seen in perspective so that their elongated shape can be visualized. Notably, the channels are moved along their elongated direction in response to the rotation of a drive screw threaded into the bracket 30.

Figure 5A:
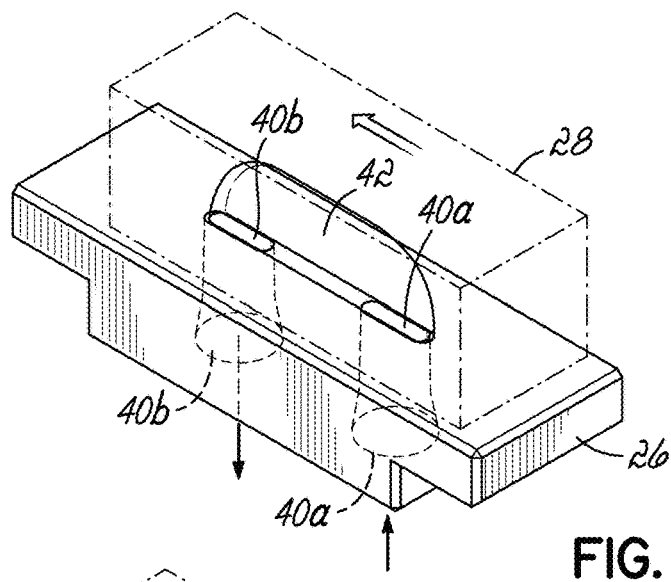
FIGS. 5A and 5B are perspective views of the internal ceramic members of the valve of the preceding Figures, with the fixed member shown in solid lines and the movable ceramic member shown in phantom, when the valve is respectively fully open and fully closed.
Figure 5B:
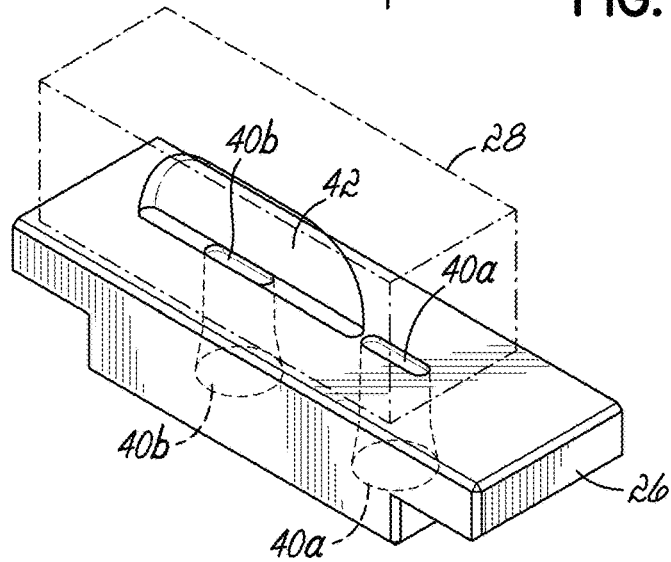
Figure 6:
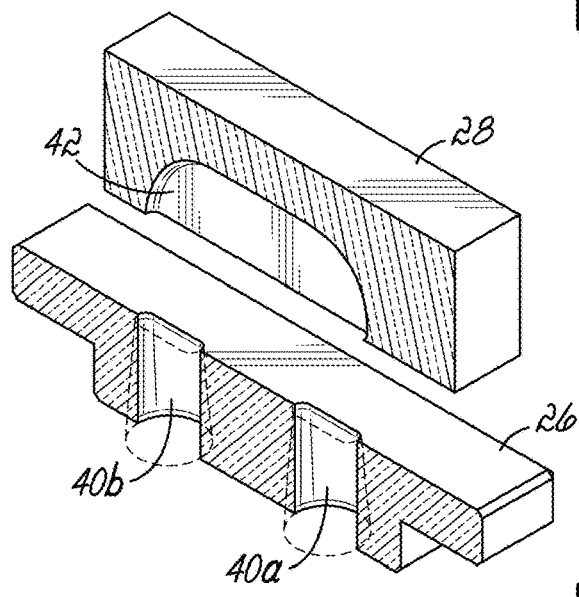
FIG. 6 is a cross sectional view of the fixed and movable ceramic members of the valve of the preceding Figures illustrating the relative positioning of the apertures of those two members.

FIGS. 5A and 5B illustrate the open and closed positions of the embodiment of a flow control valve shown in the preceding figures. FIG. 6 provides a cross-sectional perspective illuminating the mating of the flow channels 40a, 40b and 42.

Figure 7A:
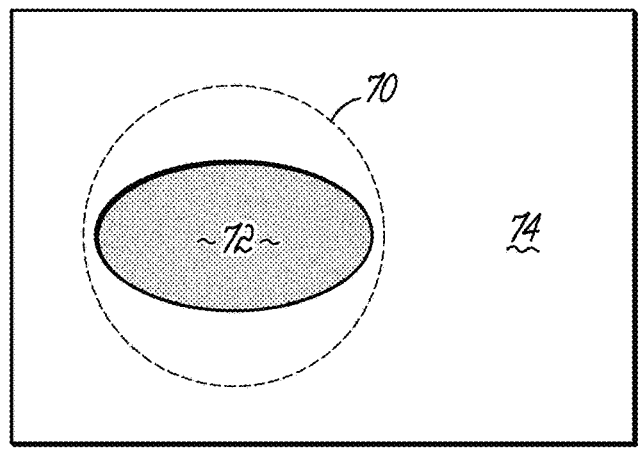
FIGS. 7A, 7B and 7C illustrate the development of an opening when a circular disk slides across an elliptical aperture as is suggested in the prior art.
Figure 7B:
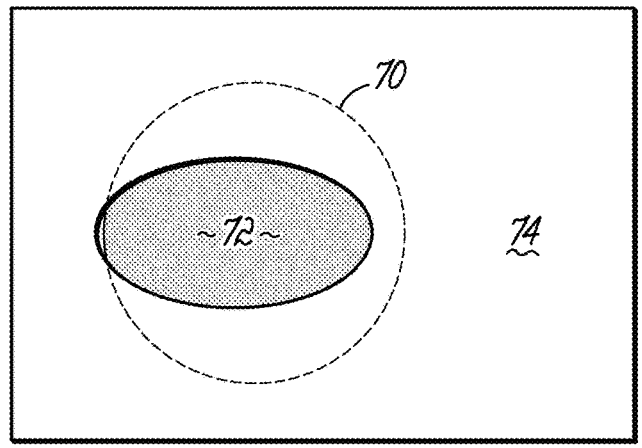
Figure 7C:
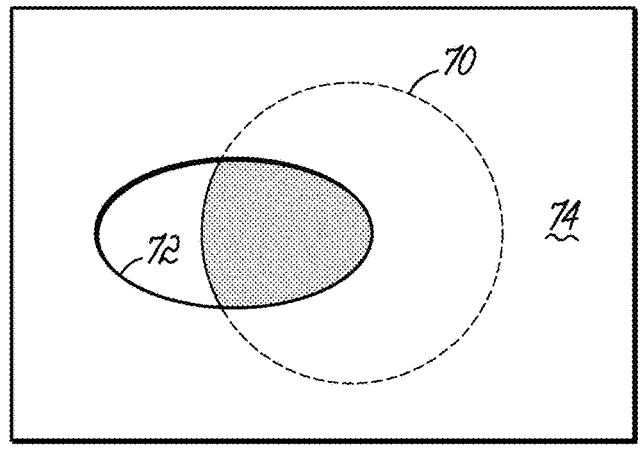

Turning now to FIGS. 7A, 7B and 7C, there is an illustration of the manner in which the '977 publication noted above implements flow control via an opening created between a movable disc 70 and an elliptical aperture 72 in a fixed disc 74. As seen in these FIGS., an opening (unshaded area) is created when the movable disc 70 slides away from a position over the elliptical aperture 72 in the fixed disc, but the opening that is created rapidly changes size and shape immediately as the movable disc is removed from covering the aperture 72 in the fixed disc. The rapid variation in size and shape can lead to a flow rate that is difficult to control and may become imbalanced or unstable.

FIGS. 8A, 8B, 8C and 8D illustrate the alternative manner in which the presently described invention implements flow control via obround openings developed between the obround first, second and third flow channels 40a, 42 and 40b. Notably, the flow path created can be very small when first opened, as seen in FIG. 8C, and the flow path grows in a controllable manner, and linearly increases in size once the two ceramic members reach the position shown in FIG. 8D. Furthermore, all flow is contained within the ceramic members and the channels through those members. As a result, the flow rate through the flow control valve is likely to be more easily controlled and balanced.

Figure 9A:
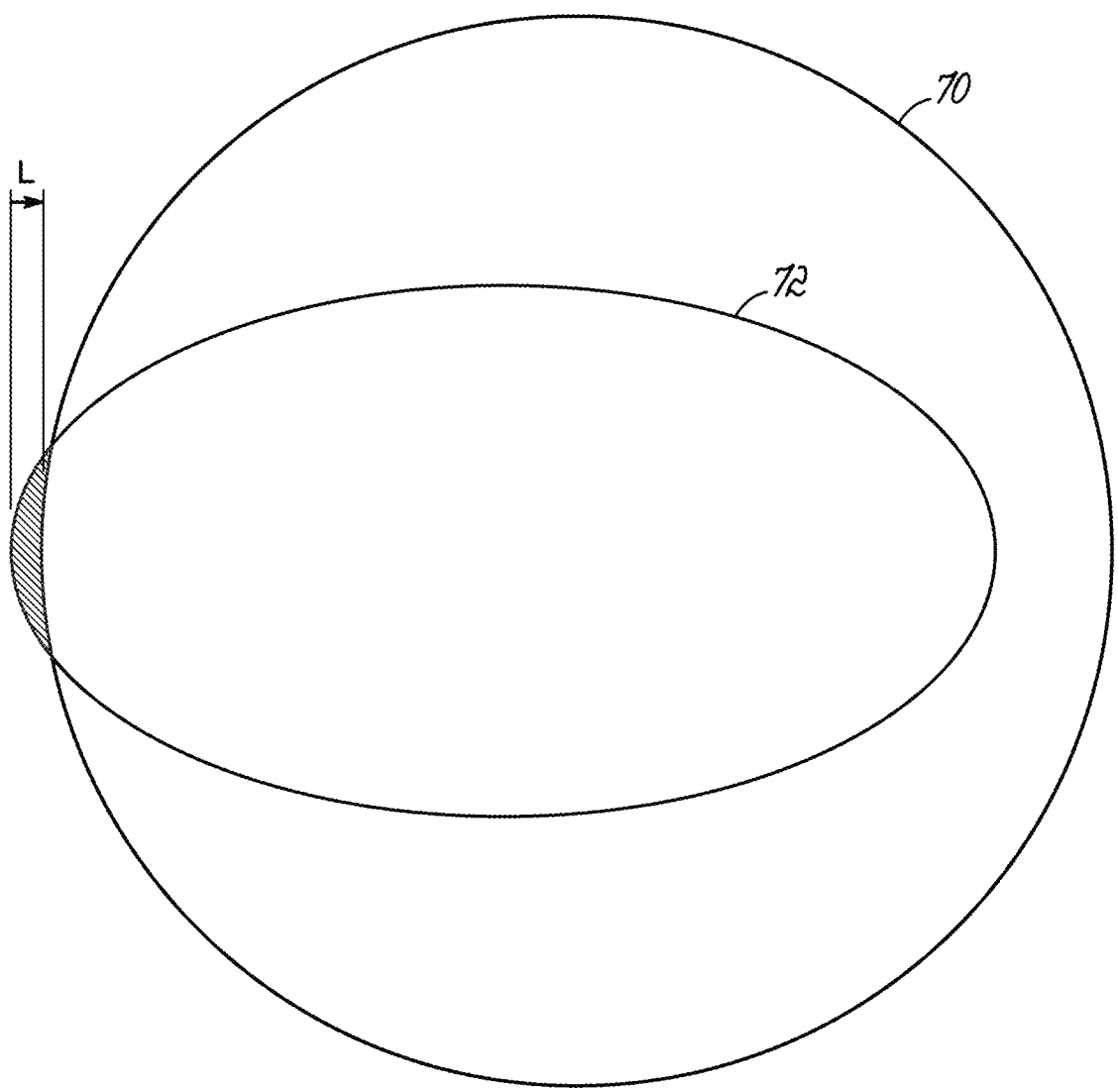
FIGS. 9A and 9B illustrate the relative size and shape of an opening formed by a given amount of movement of a movable ceramic member in the prior art configuration of FIGS. 7A-7C and the valve shown in FIGS. 1 through 6, respectively.
Figure 9B:
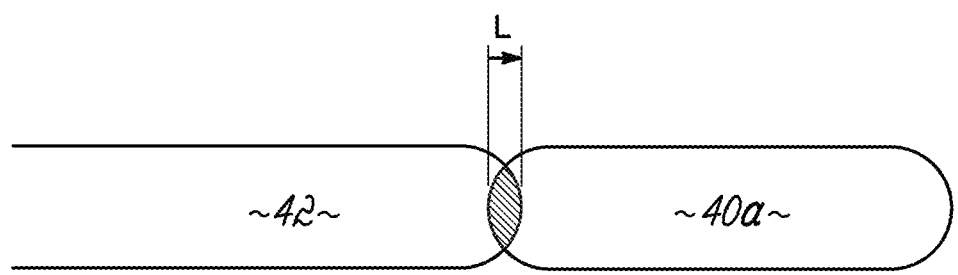

For comparison of these two alternatives, FIG. 9A shows the amount of opening created for a specific distance L of disc movement in the prior art configuration, whereas FIG. 9B illustrates the more controlled and smaller amount of opening created for the same distance L of movement of the obround openings in the ceramic elements in accordance with the present invention.

Figure 10:
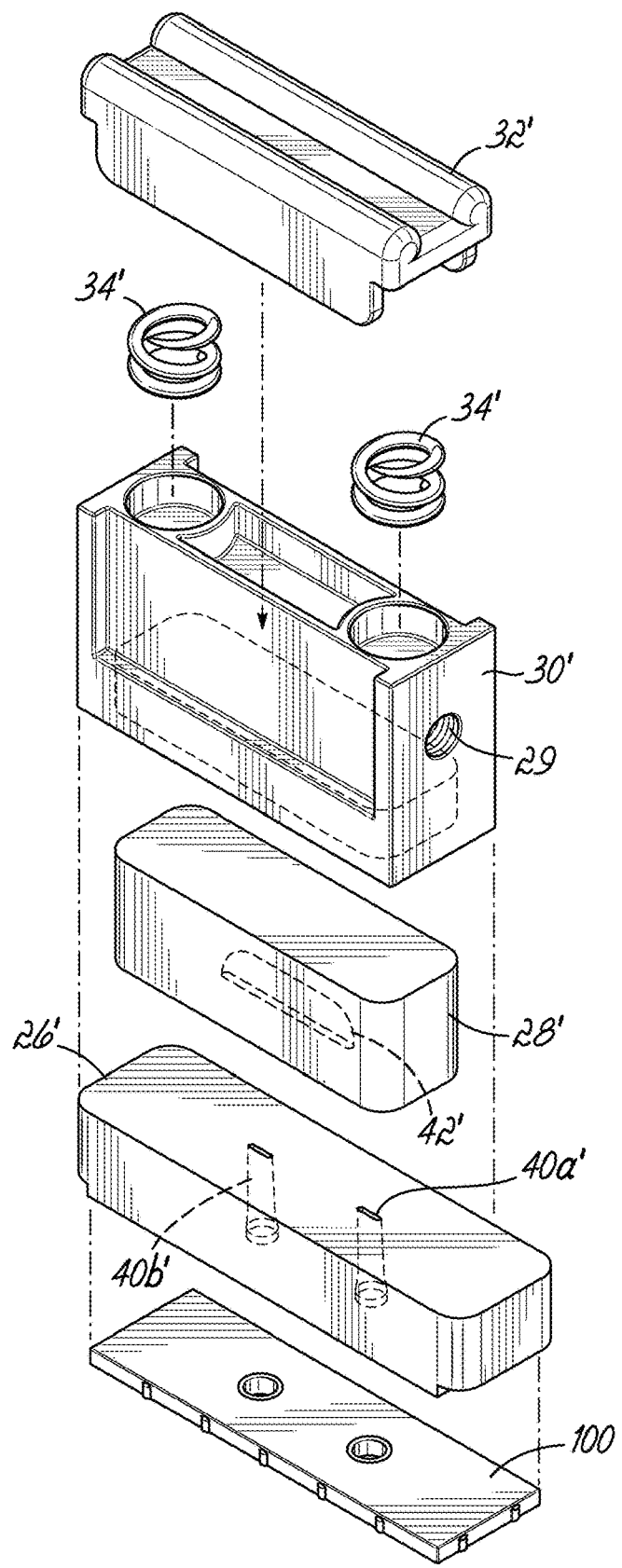
FIG. 10 is a disassembled perspective view of an alternative embodiment of a valve according to principles of the present invention utilizing alternate supporting structures for the internal fixed and movable ceramic members.

FIG. 10 illustrates an alternative embodiment of a flow control valve, consistent with principles of the present invention, in which alternate structures of the first and second ceramic elements 26' and 28' are mounted within a housing. The flow paths through the first ceramic element 26' flow through a lower mounting plate 100, not shown in the previous embodiments. The second ceramic element 28' is engaged within a modified bracket 30' which, as in the previous embodiment, is pressed into engagement with the second ceramic element 28' by a resilient member (springs 34') which engage to the valve housing via a slider 32'. The operating principles for this embodiment of the invention are identical to those of the preceding embodiments, and both are within the scope of the invention and provide the advantages of the invention claimed herein.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A flow control valve, comprising:
   a. a housing;
   b. a first ceramic member and a second ceramic member positioned within the housing, wherein the first and second members having conforming surfaces coupled together to form a fluid-tight seal, the conforming surfaces being slidable relative to each other;
   c. the first ceramic member defining a first fluid flow aperture in its conforming surface having a first width and a first length, wherein the first width is substantially less than the first length;
   d. the second ceramic member defining a second fluid flow aperture in its conforming surface having a second width and second length, wherein the second width is substantially less than the second length, and the first width is substantially similar to the second width, and the first length is less than the second length;
   e. wherein the ceramic members are slidable within the housing along the direction of the first and second lengths of the first and second apertures, between a first position in which the first and second apertures do not overlap and fluid flow is obstructed, and a second position in which the first and second apertures overlap and fluid flow is permitted through the apertures;
   f. wherein flow is controlled by the positioning of the ceramic members relative to each other to create an opening of a controlled size between the first and second apertures.

2. The flow control valve of claim 1 wherein the first ceramic member comprises a third fluid flow aperture, the third fluid flow aperture having a third width and a third length, wherein the third width is substantially less than the third length, and the third width is substantially similar to the second width.

3. The flow control valve of claim 2 wherein the first and third fluid flow apertures of the first ceramic member align with and overlap the second fluid flow aperture of the second ceramic member to permit fluid flow between the first and third apertures via the second fluid flow aperture when the ceramic members are in the second position.

4. The flow control valve of claim 3 wherein the second fluid flow aperture comprises an inlet and an outlet on the conforming surface of the second ceramic member, permitting fluid flow between the inlet and outlet.

5. The flow control valve of claim 1 wherein the first and second ceramic members are retained within the housing, the first ceramic member being affixed to the housing and the second ceramic member being movable relative to the housing.

6. The flow control valve of claim 1 further comprising a bracket defining a threaded hole and a lead screw received within the threaded hole, the bracket being engaged to the second ceramic member so that rotation of the lead screw causes movement of the second ceramic member relative to the first ceramic member.

7. The flow control valve of claim 1 wherein the first and second ceramic members are maintained with their conforming surfaces in contact by a resilient member extending between the second ceramic member and an interior of the housing.

8. The flow control valve of claim 7 wherein the resilient member comprises a spring which is compressed between the second ceramic member and an interior of the housing.

9. The flow control valve of claim 7 wherein the resilient member is compressed between the second ceramic member and a sliding member engaged to an interior of the housing.

* * * * *